United States Patent
Park

(10) Patent No.: US 9,621,675 B2
(45) Date of Patent: Apr. 11, 2017

(54) BRIEFING-ALARM SERVICE PROVISION APPARATUS AND METHOD OF PORTABLE TERMINAL

(71) Applicant: Samsung Electronics Co., Ltd., Gyeonggi-do (KR)

(72) Inventor: Harkkyu Park, Seoul (KR)

(73) Assignee: Samsung Electronics Co., Ltd (KR)

( * ) Notice: Subject to any disclaimer, the term of this patent is extended or adjusted under 35 U.S.C. 154(b) by 175 days.

(21) Appl. No.: 14/230,345

(22) Filed: Mar. 31, 2014

(65) Prior Publication Data

US 2014/0297812 A1 Oct. 2, 2014

(30) Foreign Application Priority Data

Mar. 29, 2013 (KR) .......................... 10-2013-0034438

(51) Int. Cl.
*G06F 15/16* (2006.01)
*H04L 29/08* (2006.01)

(52) U.S. Cl.
CPC ............ *H04L 67/32* (2013.01); *H04L 67/306* (2013.01); *H04L 67/16* (2013.01)

(58) Field of Classification Search
CPC ....................................................... H04L 67/16
USPC ................................................. 709/217, 219
See application file for complete search history.

(56) References Cited

U.S. PATENT DOCUMENTS 8,195,203 B1 * 6/2012 Tseng ................ H04M 1/72569
455/414.3
2012/0108215 A1 * 5/2012 Kameli ............... H04M 1/0256
455/412.2

* cited by examiner

*Primary Examiner* — Adnan Mirza
(74) *Attorney, Agent, or Firm* — The Farrell Law Firm, P.C.

(57) ABSTRACT

A method and apparatus for providing briefing information from a portable terminal to a user is provided. Briefing information is received and stored before an alarm time that is set according to a briefing alarm configuration. An alarm is output at the alarm time. The briefing information is displayed when the alarm turns off.

22 Claims, 13 Drawing Sheets

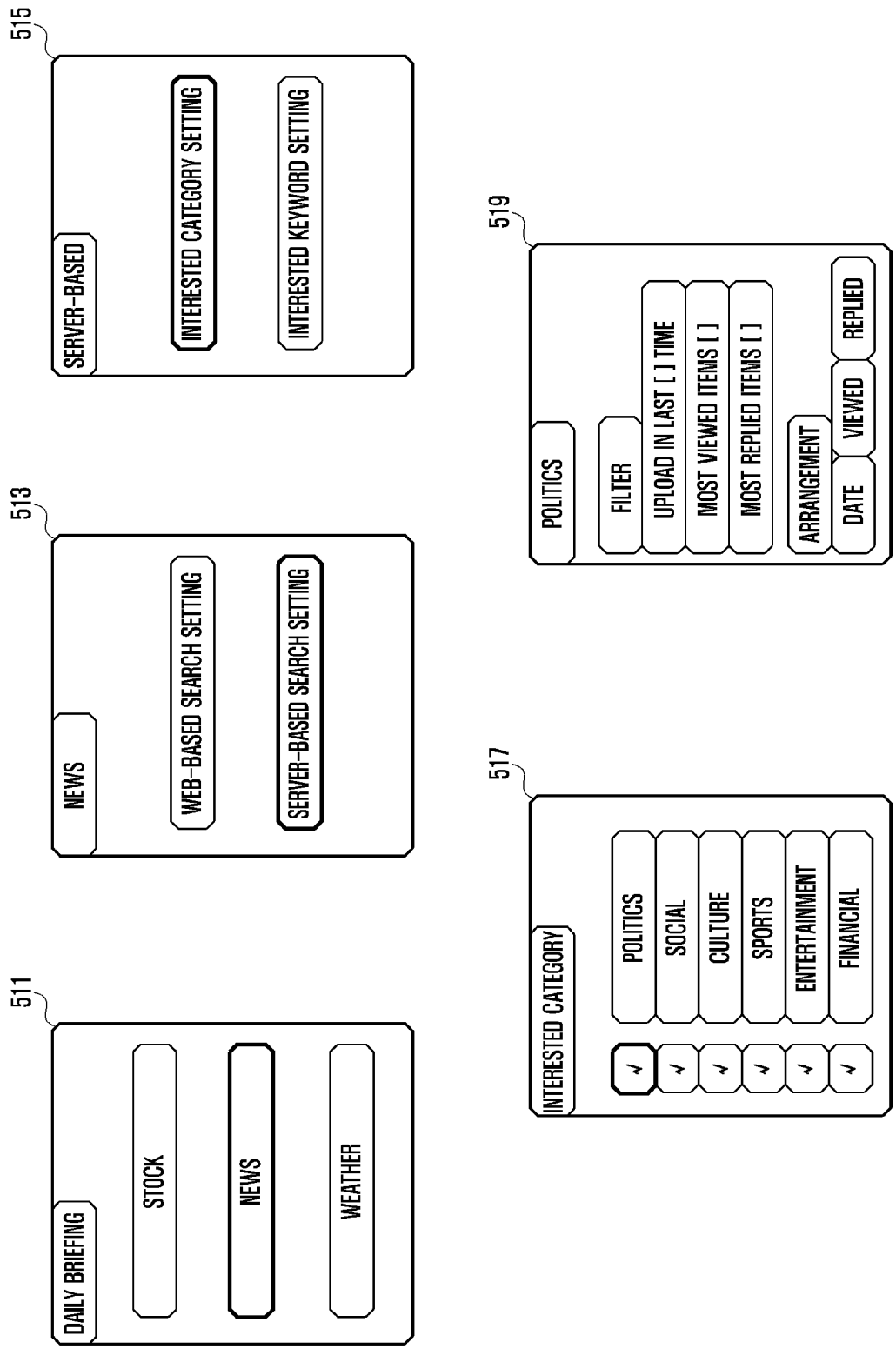

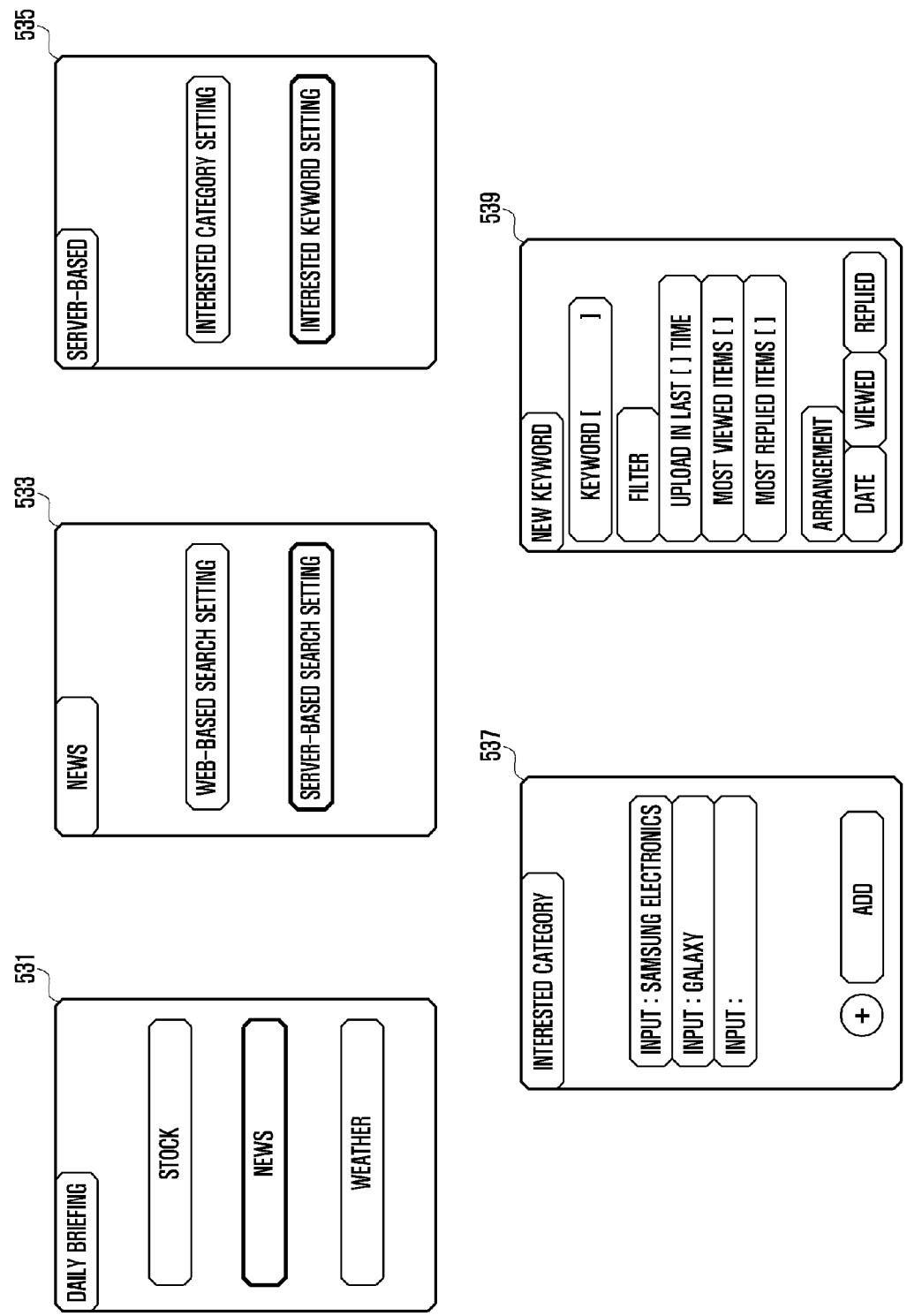

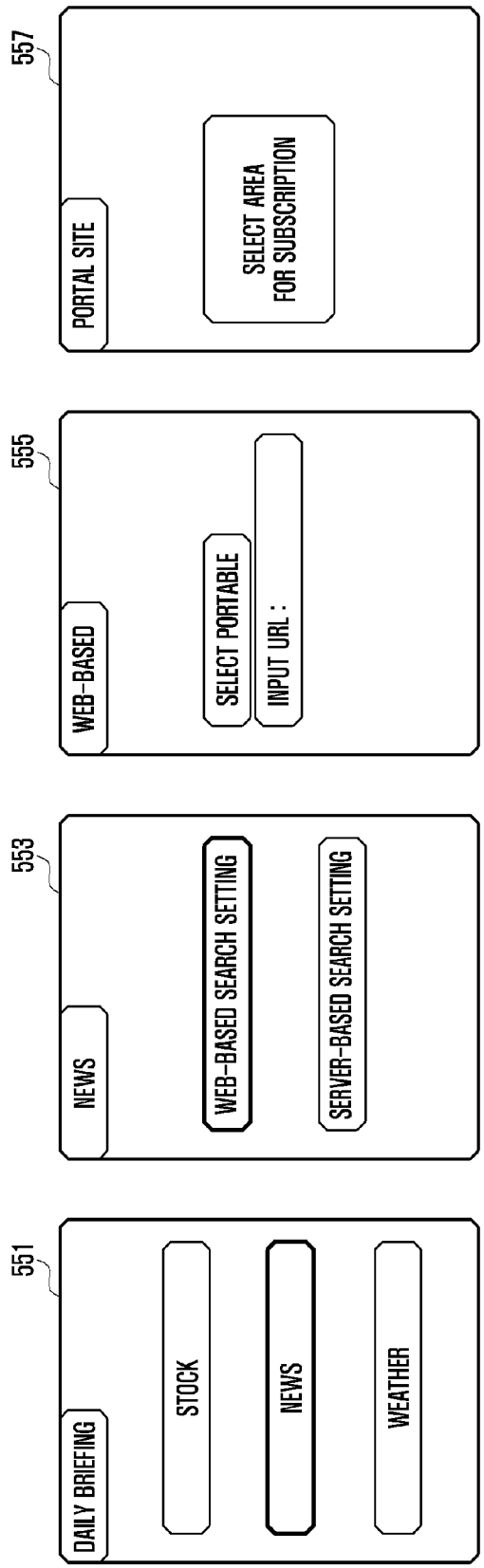

BRIEFING-ALARM SERVICE PROVISION APPARATUS AND METHOD OF PORTABLE TERMINAL

PRIORITY

This application claims priority under 35 U.S.C. §119(a) to Korean Patent Application Serial No. 10-2013-0034438, which was filed in the Korean Intellectual Property Office on Mar. 29, 2013, the entire disclosure of which is hereby incorporated by reference.

BACKGROUND

1. Field of Invention

The present invention relates generally to an information provision service apparatus and method of a portable terminal and, more particularly, to an apparatus and method for briefing information on preregistered items at a preset time.

2. Description of the Related Art

The alarm function of a portable terminal can be configured by the user in various situations so as to output a preset alarm sound (e.g. music) at the time set by the user. Recently, various types of alarm services have been provided to meet the user requirements.

As a person is preparing to go to work or out, the person may turn on the TV or pick up a portable terminal to check on events that occurred overnight. Watching TV means that the user watches the TV regardless of the user's interest in the information provided by the TV, and picking up the portable terminal means that the user is ready to take the necessary steps required to operate the portable terminal (e.g. turning on the terminal, web-surfing (news, stock, weather, etc.), and checking schedule).

In order to overcome such inconveniences, there is a need of a method for collecting information on the issues that occurred during a period in which the user could not check the information and providing this information to the user along with an alarm.

SUMMARY

The present invention is designed to address at least the problems and/or disadvantages described above and to provide at least the advantages described below.

Accordingly, an aspect of the present invention provides a briefing alarm service provision apparatus and method that is capable of outputting information which a user is interested in at the preset alarm time using a portable terminal equipped with the briefing alarm function.

Another aspect of the present invention provides a briefing-alarm service provision apparatus and method that is capable of downloading preregistered briefing information when the briefing-alarm is activated and outputting the downloaded briefing information using the portable terminal and/or other peripheral devices.

Another aspect of the present invention provides a briefing-alarm service provision apparatus and method that is capable of outputting briefing information in various forms depending on the user's settings along with displaying the briefing information on the screen.

In accordance with another aspect of the present invention, a briefing-alarm service method of a portable terminal is provided. The briefing-alarm service method includes receiving and storing briefing information before an alarm timeset according to a briefing alarm configuration, outputting an alarm at the alarm time, and displaying the briefing information when the alarm turns off.

In accordance with yet another aspect of the present invention, a briefing alarm service apparatus of a portable terminal is provided. The briefing alarm service apparatus includes a communication unit which requests and downloads interested briefing information, a storage unit which stores the downloaded briefing information, an output unit which outputs the briefing information, and a control unit which controls the communication unit to request and download the interested briefing information at a preset download time and play the downloaded briefing information at an alarm time.

BRIEF DESCRIPTION OF THE DRAWINGS

The above and other aspects, features, and advantages of certain embodiments of the present invention will be more apparent from the following detailed description when read in conjunction with the accompanying drawings, in which:

FIGS. 5A to 5F are diagrams illustrating examples of screen displays for explaining the briefing alarm function configuration procedure shown in FIGS. 4A and 4B;

DETAILED DESCRIPTION OF EMBODIMENTS OF THE PRESENT INVENTION

Various embodiments of the present invention are described in detail below with reference to the accompanying drawings. The same reference numbers are used throughout the drawings to refer to the same or like parts. Additionally, detailed descriptions of well-known functions and structures incorporated herein may be omitted to avoid obscuring the subject matter of the present invention.

The alarm service method according to an embodiment of the present invention displays the information preset by the user along with the alarm sound at the alarm time. In order to achieve this, the portable terminal, according to an embodiment of the present invention, requests a server to transmit the user interested information set by the user before the preset alarm time and stores the information downloaded from the server as the briefing information. Afterward, when the alarm time arrives, the portable terminal outputs a preset alarm message and, if a user interaction is detected, displays the briefing information downloaded before the alarm time to the user.

The briefing information may be the user interested information such as stock, news, weather, and appointments. Here, the alarm may be set for a morning call.

In the following description, the term "briefing alarm" is used to describe the alarm service of displaying the user interested information set along with an alarm time.

Figure 1:
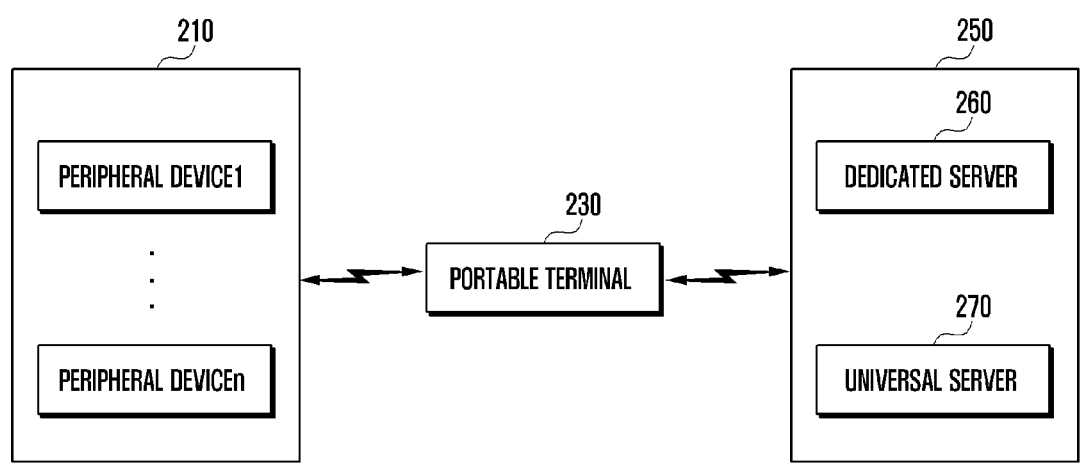
FIG. 1 is a schematic diagram illustrating a system for providing the briefing alarm service according to an embodiment of the present invention.

FIG. 1 is a schematic diagram illustrating a system for providing the briefing alarm service according to an embodiment of the present invention.

Referring to FIG. 1, the portable terminal 230 is provided with a briefing alarm service function and is in operable communication with the server 250 to download the preset user interested information before the briefing alarm time. The briefing alarm function may be preloaded as an application or downloaded from an application server and installed in the portable terminal 230. The briefing alarm function may be implemented in addition to the existing alarm function. Here, the server 250 may be categorized into a dedicated server 260 which provides the briefing information dedicatedly and/or a universal server 270 which provides general information search service. Here, the dedicated server 260 may be the server which searches for the information to be provided at the briefing alarm time, and the universal server 270 may be the server which provides the portal service. The portable terminal 230 configures the time for downloading the briefing information along with the alarm time, and the download time is set early enough to download all of the briefing information before the arrival of the alarm time. When the download time arrives, the portable terminal 230 requests the server 250 to transmit the briefing information and stores the briefing information downloaded from the server 250.

When the alarm time arrives, the portable terminal 230 outputs the alarm (e.g. preset alarm sound) and displays the downloaded briefing information to the user in response to a user's turn-off action of the alarm. At this time, if a communication link activation option is configured, the portable terminal 230 establishes a communication link with the peripheral device 210 to output the briefing information.

Figure 2:
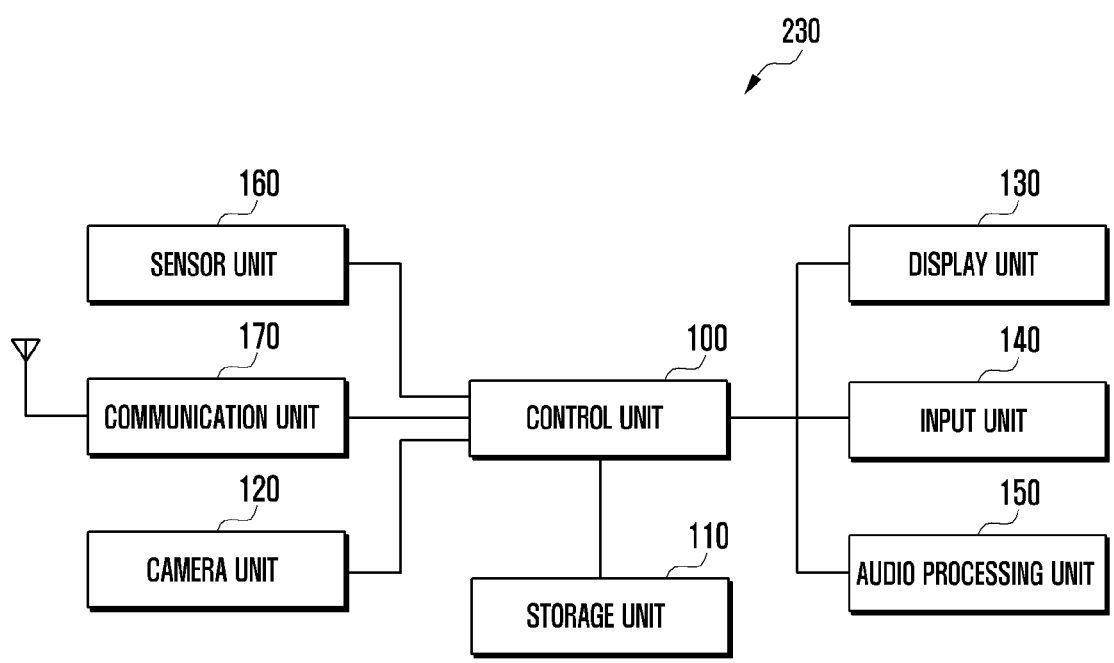
FIG. 2 is a block diagram illustrating a configuration of the portable terminal providing the briefing alarm service according to an embodiment of the present invention.

FIG. 2 is a block diagram illustrating a configuration of the portable terminal 230 that provides the briefing alarm service according to an embodiment of the present invention.

Here, the portable terminal 230 may be any of various types of digital devices including smartphone, mobile terminal, MP3 player, tablet computer, and desktop computer.

Referring to FIG. 2, the communication unit 170 is responsible for radio communication of the portable terminal 230 with an external device. The communication unit 170 includes a transmitter for frequency up-converting and amplifying the transmission signal and a receiver for low noise amplifying and frequency down-converting the received signal. The communication unit 170 includes a modulator and a demodulator. The modulator modulates the transmission signal and transfers the modulated signal to the transmitter, and the demodulator demodulates the signal received by the receiver. In this case, the modulator/demodulator may support one or more wireless communication protocols such as Long Term Evolution (LTE), Wideband Code Division Multiple Access (WCDMA), and/or Global System for Mobile communications (GSM), Wi-Fi, WiBro, Near Field Communication (NFC), and Bluetooth. The communication unit 170 may be provided with a plurality of communication modules, and this embodiment is directed to an embodiment where the communication unit 170 is provided with short range wireless communication modules for communication with peripheral devices through Wi-Fi and/or Bluetooth links.

The camera unit 120 takes images. Here, the camera unit 120 is provided with a rear camera mounted on the rear of the portable terminal 230 for taking high resolution images and a front camera mounted on the front of the portable terminal 230 for taking relatively low resolution images.

The control unit 100 controls overall steps of the portable terminal 230 and provides the briefing alarm service function according to an embodiment of the present invention.

The storage unit 110 includes a program memory for storing the Operating System (OS) of the portable terminal 230, application programs according to an embodiment of the present invention, data memory for storing tables concerning the steps of the portable terminal 230, and data generated by the applications running in the terminal.

The display unit 130 displays the information on the application running under the control of the control unit 100. In an overlay shooting mode, the display unit 130 displays a background image and a guide image along with the overlay of the image to be shot. The display unit 130 may be implemented with Liquid Crystal Display (LCD) or Organic Light Emitting Diodes (OLED).

The input unit 140 may be implemented in a capacitance type or a resistance type to generate the location information on a user's touch (hereinafter, assumed to be a finger touch) to the control unit 100. The input unit 140 may further includes an Extraordinary Magnetoresistive (EMR) sensor pad for detecting the pen touch input and generates an input signal to the control unit 100. Here, the display unit 130 and the input unit 140 may be integrated into a single function block.

The audio processing unit 150 processes the voice signal generated in the communication mode under the control of the control unit 100.

The sensor unit 160 may include a plurality of sensors (not shown) for detecting the motion of the portable terminal 230. Here, the sensors may include an acceleration sensor, a terrestrial magnetism sensor and/or a location detection sensor.

In the above-structured portable terminal 230, the control unit 100 configures the information to be briefed in the briefing alarm configuration process and downloads and displays the briefing information at the alarm time. The control unit 100 may configure the collection target information, information download time, alarm time, alarm option, and alarm turn-off method, etc.

Depending on the configuration of the briefing alarm function, the control unit 100 may perform the briefing alarm service function. For the briefing alarm service, the briefing information download time is set earlier than the alarm time, and the interval between the download and alarm times has to be long enough to download the user-interested information set by the user. The control unit 100 establishes a communication link with the server 250 by controlling the communication unit 170 to request the server 250 to transmit the user-interested information at the download time and stores the information downloaded from the server 250 in the storage unit 110 as the briefing information.

Here, the information that can be stored as briefing information in the portable terminal 230 may include appointments (e.g., conferences, schedules, phone calls, etc.) and personal information (e.g. email, Social Networking Service (SNS), and Multimedia Messaging Service (MMS) reception information and missed calls). When the alarm time arrives, the control unit 100 outputs the alarm in a predetermined way (e.g. a preset alarm sound). If the user turns off the alarm in a predetermined way, the control unit 100 accesses the briefing information stored in the storage unit 110 and controls the display unit 130 to display the briefing information and the audio processing unit 150 to convert the briefing information to an audio signal using a text-to-speech conversion function, the audio signal being output through a speaker in the form of audible sound waves. The control unit 100 controls the audio processing unit 150 to output the briefing information at a volume level higher than the volume level set currently in the portable terminal. If a link activation option is configured with a peripheral device, the control unit 100 controls the communication unit 170 to establish a communication link with the peripheral 210 and output the briefing information by means of the peripheral device 210. At this time, the peripheral device 210 may be the device having a display and/or a speaker such as a television and tablet computer that is capable of receiving and playing the briefing information and the corresponding audio signal.

Figure 3:
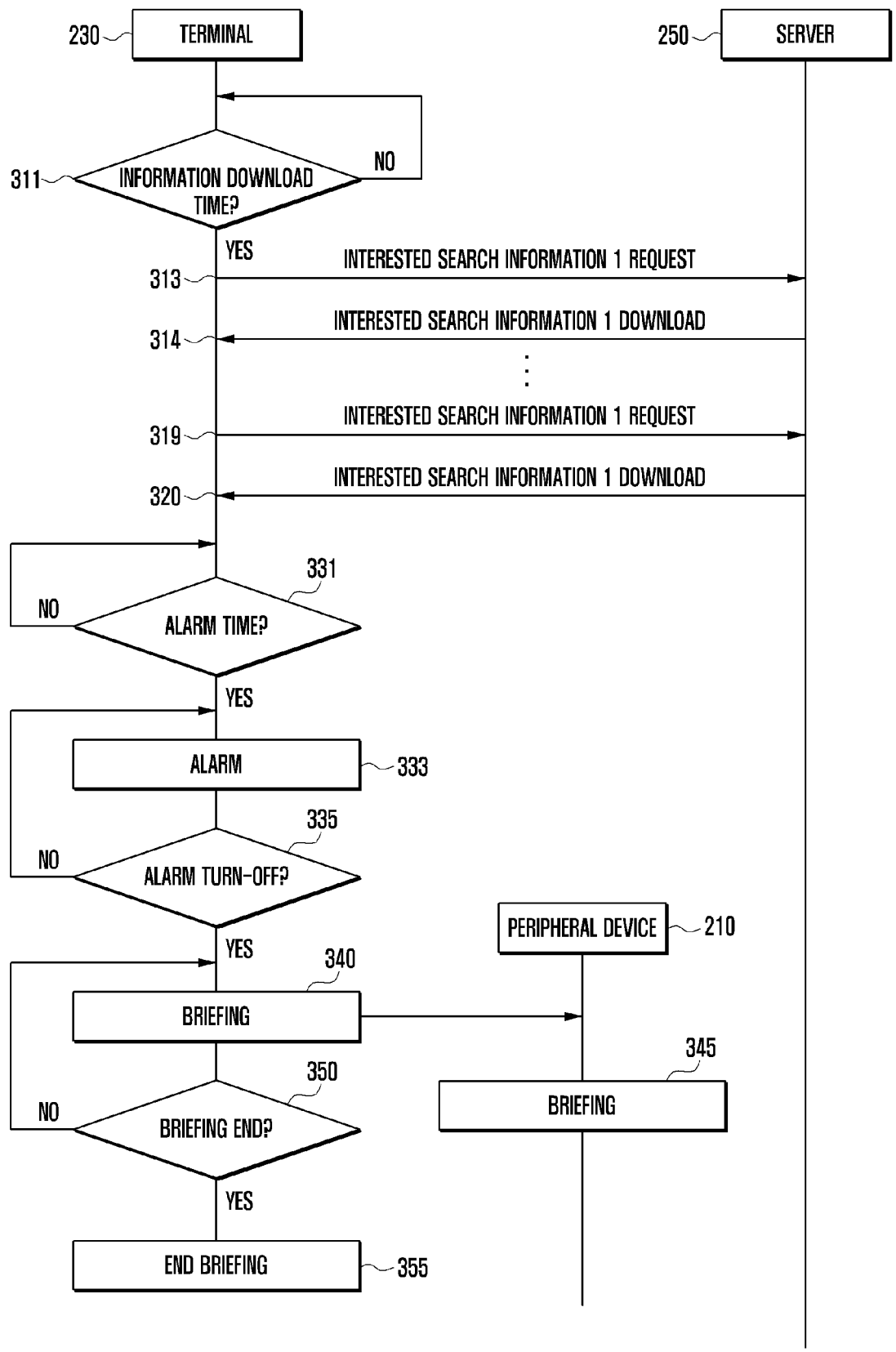
FIG. 3 is a flowchart illustrating a procedure of processing the briefing information between devices in the briefing information service system according to an embodiment of the present invention.

FIG. 3 is a flowchart illustrating a procedure of processing the briefing information between devices in the briefing information service system according to an embodiment of the present invention.

Referring to FIG. 3, if the information download time arrives at step 311, the portable terminal 230 controls the communication unit 170 to check the state of the communication link with the server 250 and, if necessary, establishes a communication link with the server 250. At this time, the briefing information may be provided in different fashions depending on the server type.

First, a description is made of the briefing alarm function provision server (dedicated server 260). In the instance where the user has notified the dedicated server 260 of the interested search information already, the portable terminal 230 sends an interested information search request message immediately after the establishment of the communication link at steps 313 and 319, and the server 250 transmits the user interested information to the portable terminal 230 in response to the interested information search request at steps 314 and 320. In this case, the portable terminal 230 sends the dedicated server 260 the interested search information and receives the briefing information downloaded from the dedicated server 260. In another embodiment, if the alarm time information of the portable terminal 230 is known to the server 250, the server 250 may check the communication link connection state with the portable terminal 230 and transmits the user interested information to the portable terminal 230 without receipt of the interested information search request before the alarm time. In this case, steps 313 and 319 are omitted. That is, the portable terminal 230 sends the server 250 the briefing information search request message including the interested search information and download time information, and the server 250 searches for the briefing information corresponding to the user interested information and transmits the found user interested information to the portable terminal 230.

In the case that the server (e.g. universal server 270) cannot store the interested search information, the portable terminal 230 sends the server 250 a user interested information search request message including the interested search information and the information on the portable terminal 230, and the server 250 searches for the information based on the received interested search information and sends the found information to the portable terminal 230 as the briefing information based on the device information of the portable terminal 230.

FIG. 3 is directed to the case where the server 250 is a universal server 270. In this case, the control unit 100 sends the server 250 an interested information request message. There can be a plurality of interested information request messages. The interested information request message may be configured differently depending on the portable terminal 230. In the case that the interested information request message includes the interested search information (e.g. news, stock, and weather), it is necessary to send the interested information request message once. In this case, the control unit 100 sends the server 250 the interested search information in the process of steps 313 to 320 to request for the corresponding information. The interested information request message may include daily briefing information (stock, news, weather, etc.), category values of the selected interested information, filter value (most recently posted, most replied, most viewed), arrangement scheme, favorite keyword, GPS value, and scheduling information. The portable terminal 230 user information (phone number, unique ID, etc.) is the information which the server 250 can collect and transmit to the portable terminal 230. The portable terminal 230 downloads and stores the information retrieved by the server 250. The control unit 100 may store the briefing information including the user's appointments configured by the user and/or private information updated through communication. The above operation is performed until the download of the user-interested information is completed, e.g. before the alarm time.

When the alarm time arrives, the control unit 100 detects this at step 331 and outputs the alarm in a predetermined manner. At this time, the alarm can be output with an alarm sound or music and/or vibration (or other suitable method that is perceivable by the user, e.g., alarm light). If the user inputs an alarm turn-off signal in the above state at step 333, the control unit 100 detects this at step 335, turns off the alarm at step 335, and executes the information briefing service 340 function sequentially. At this time, since the user may not keep paying attention to the screen, the control unit 100 controls converts the briefing information to a voice message and controls the audio processing unit 130 to play the voice message. If the briefing information display function is configured to communicate with a peripheral device 210, the control unit 100 detects this and establishes a communication link with the peripheral device by means of the short range communication unit 170 that supports one of the known wireless communication standards, e.g., IEEE 802.11, IEEE 802.15, IEEE 802.15.1-IEEE 802.15.6, IEEE 802.16, and ISO/IEC 18092 to transmit the briefing information at step 345. If the briefing information provision service is completed, the control unit 100 detects this at step 350 and ends the briefing service at step 355.

The control unit 100 generates the alarm in a predetermined way, and the user turns off the alarm in a predetermined way. At this time, the alarm may be turned off by way of key (button) manipulation, or action detection by means of the sensor unit 160 (e.g. detecting user's terminal pick-up action and other predetermined gesture). If the alarm is turned off, the control unit 100 converts the user-interested information preset by the user to a voice message and starts briefing with speech.

At this time, the control unit 100 generates the user-interested information such as news, stock, and weather preset by the user before the alarm time. The control unit 100 receives the user-interested information from at least one of the dedicated server 260 and the universal server 270 (content provider server) and/or in association with the application running in the portable terminal 230 before the alarm time. Here, the dedicated server 260 is the server providing the briefing alarm function in association with the portable terminal 230. In particular, the dedicated server 260 registers per-user interested items, collects, processes, and stores the information corresponding to the user interested items, and presents the information to the user. The universal server (content provision server) 270 may be the server providing the contents such as a web server (e.g. Naver and Google servers) that requests the corresponding web server for the user-interested items and provides the portable terminal 230 with the information. In the case of interoperating with an application running in the portable terminal, the information is provided by specific applications (such as the stock and weather applications) installed in the portable terminal 230, the data being stored by the applications and updated in response to an update request.

Hereinafter, a description is made of the operation of configuring user-interested information in association with the application running in the dedicated server 260, content provision server 270, and/or portable terminal 230 in the briefing alarm configuration mode.

Figure 4A:
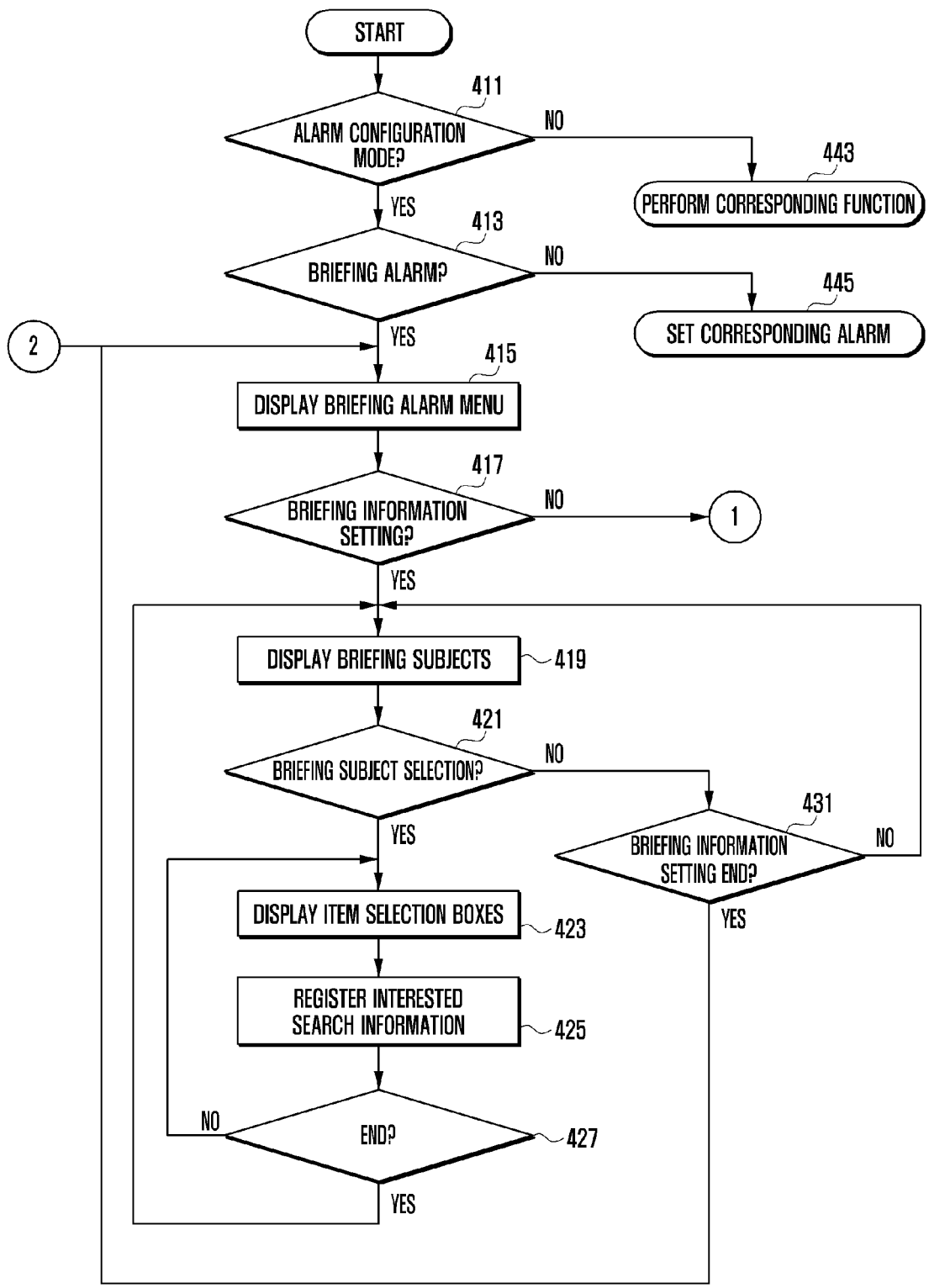
FIGS. 4A and 4B are flowcharts illustrating a procedure for configuring the briefing alarm function according to an embodiment of the present invention.
Figure 4B:
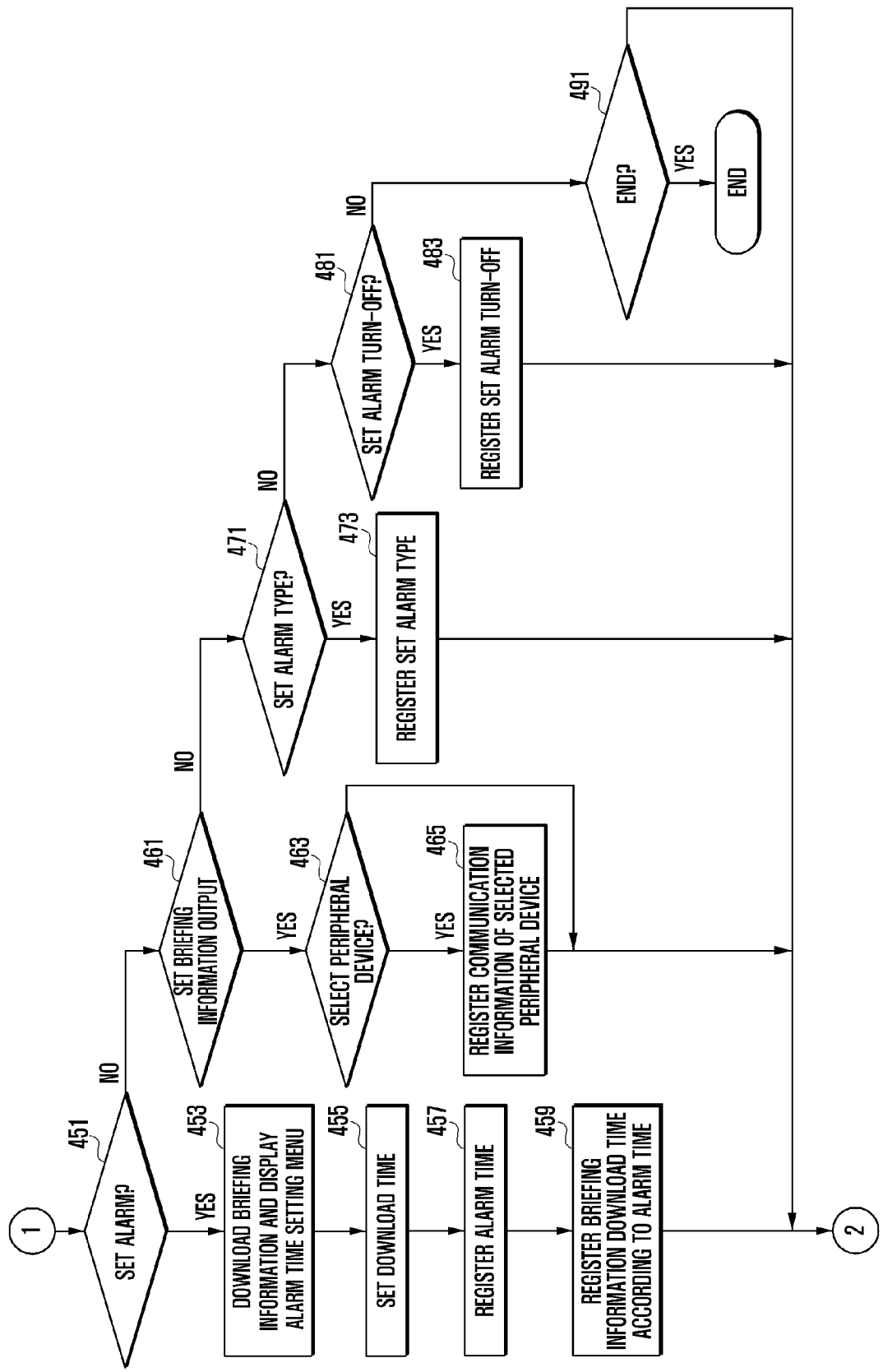

FIGS. 4A and 4B are flowcharts illustrating a procedure of configuring the briefing alarm function according to an embodiment of the present invention. FIGS. 5A to 5F are diagrams illustrating examples of screen displays for explaining the briefing alarm function configuration procedure shown in FIGS. 4A and 4B.

Referring to FIGS. 4A, 4B, and 5A to 5F, the control unit 100 detects the alarm configuration mode at step 411 and controls the display unit 130 to display the alarm menu including the briefing alarm item. If the user selects the briefing alarm item, the control unit 100 controls the display unit 130 to display the briefing alarm menu at step 415. The briefing alarm menu may include briefing information setting, alarm time setting, briefing information output method setting, alarm type setting, and alarm turn-off method setting items.

In the briefing information configuration method, the control unit 100 detects the briefing information configuration at step 417 and controls the display unit 130 to display the configurable briefing subject items at step 419. Here, the briefing subject is the subject for storing the interested information and may include news, stock, weather, appointments, and private information. That is, the briefing subject may include the information that can be downloaded for external servers or retrieved in the portable terminal 230. If a specific subject item is selected, the control unit 100 detects this at step 421 and displays an input box for selecting the search information of the selected subject and registers the interested information (category, keyword, and search method for the interested information) at step 425. In the case of selecting the subject processed in the portable terminal 230 as the briefing information, the control unit 100 displays a menu screen capable of selecting the configurable appointment information (schedule, anniversary, conference, etc.) and private information (e.g., email, SNS, MMS, missed information, etc.) and configure the corresponding items as the search items according to the user selection.

In the following, the description is made under the assumption that the briefing subject includes news, stock, and weather.

Referring to FIG. 5A, a method for configuring the briefing information (e.g., news) is described. Here, the interested subject includes information which the user wants to be briefed (such as appointments (e.g., schedules), stock, news, and weather) at the alarm time designated by the user. The information is hereinafter referred to as "daily briefing."

The control unit 100 controls the display unit 130 to display the briefing subject items at step 419. If the user selects "news", the control unit 100 controls the display unit 130 to display the input boxes (as shown in the screen display 513 of FIG. 5A) in order for the user to select the target server or method. At this time, the user may select a web-based search or a server-based search or installed application-based retrieval. If the search target server or method has been determined already, the information shown on the screen display 513 can be omitted. If the "server-based search" is selected, the control unit 100 controls the display unit 130 to display an input box as denoted by screen display 515 such that the user can select user-interested categories from the content of the selected news article selected in the input box. At this time, if the interested category is selected, the control unit 100 controls the display unit 130 to display the input boxes as shown in the screen display 517. The interested categories (e.g., news) may include "politics," "economy," "social," and "culture," and the user may select at least one interested category. If one of the interested categories is selected, the control unit 100 may configure the filter information for configuring the briefing information in the corresponding category. Specifically, the screen display 519 of FIG. 5A shows the filter information of "most viewed," "most replied," and "upload in last [ ] time," and the user may select a filter to configure the interested search information. If the "arrangement" item is added optionally to select two or more items are selected in the filter, it is possible to request for displaying the items while changing the arrangement priority. In this case, the interested search information is configured in the form of "interested subject (news)/server (dedicated server)/interested category (politics)/filter (most viewed)."

In the case that the search target server is the dedicated server 260, the portable terminal 230 authentication process is performed (not shown), and per-terminal interested search information are transmitted to be stored in the dedicated server 260. Then the dedicated server 260 searches for the above-structured interested search information using the content of the dedicated server 260 or interested search information of the portable terminal 230 which is received from another provision server and transmits the retrieved information to the portable terminal 230. In the case that the search target server is the universal server 270, the control unit 100 generates a briefing information request message including the requesting portable terminal information and interested search information configured by the portable terminal at step 313 of FIG. 3 and transmits the briefing information request message to the universal server 270 by means of the communication unit 170.

FIG. 5B illustrates a procedure of generating the interested search information through an interested keyword configuration at the dedicated server 260. Screen displays 531 to 535 of FIG. 5B are identical with screen displays 511 to 515 of FIG. 5A. If an interested keyword is selected on the screen 535, the control unit 100 controls the display unit 130 to display an input box for receiving the interested keyword input as shown in the screen display 537. If interested keywords (here, Samsung Electronics and Galaxy) are input in the input box, the control unit 100 configures the filter information for configuring the briefing information associated with the interested keyword input. The filter information may have a structure as shown in the screen display 519 of FIG. 5A. In this case, the interested search information is configured in the form of "interested subject (news)/server (dedicated server)/interested keyword (Samsung Electronics, Galaxy)/filter (most viewed)." If the above-structure interest search information is received, the dedicated server 260 retrieves the information in its storage and transmits the retrieved information to the portable terminal.

FIG. 5C illustrates a procedure of configuring a search scheme at the universal server (content provision server-based or web-based). Screen displays 551 and 553 are identical with screen displays 511 and 513 of FIG. 5A. In the case of downloading the briefing information from the universal server 270, the user selects an interested subject (news) and configures the search target server to perform a web-based, i.e. universal server-based, search. In the case of a web-based search, the control unit 100 controls the display unit 130 to display input boxes as shown in the screen display 553, and the user may configure the briefing information on the web address portal site as shown in the screen display 555. For example, if an address of "www.naver.com" is input, the control unit 100 controls the communication unit 170 to connect to the Internet and the display unit 130 to display the Naver portal site (screen display 557) and, in this state, the user may configure a range for acquiring the briefing information on the portable site screen.

Figure 5D:
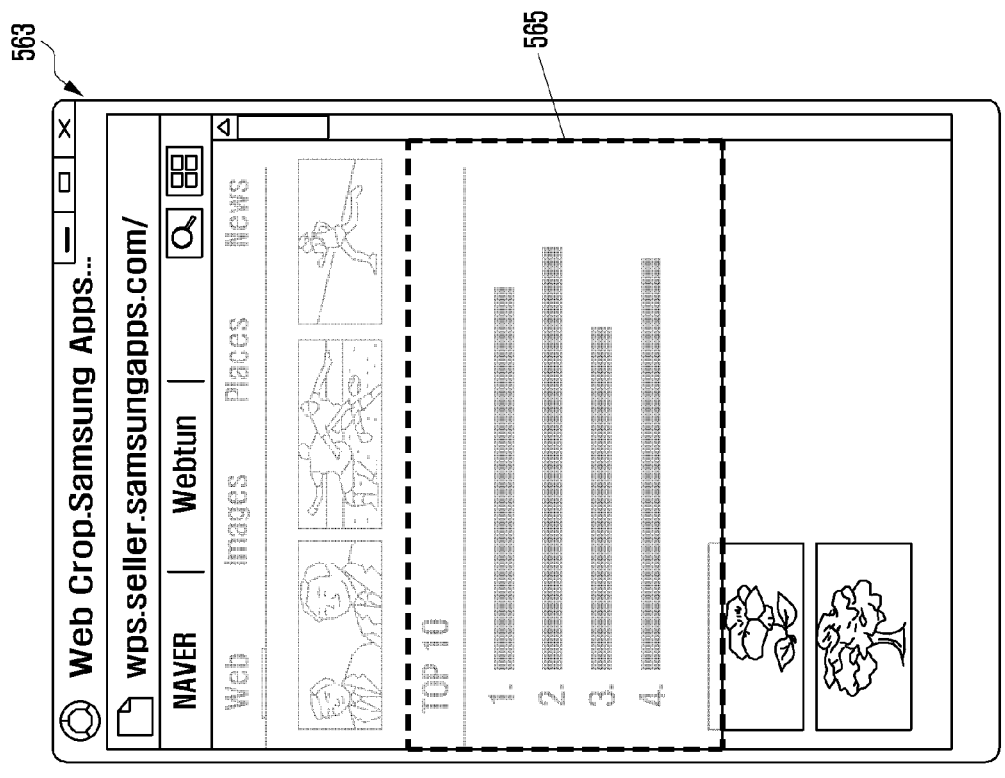
Figure 5D:
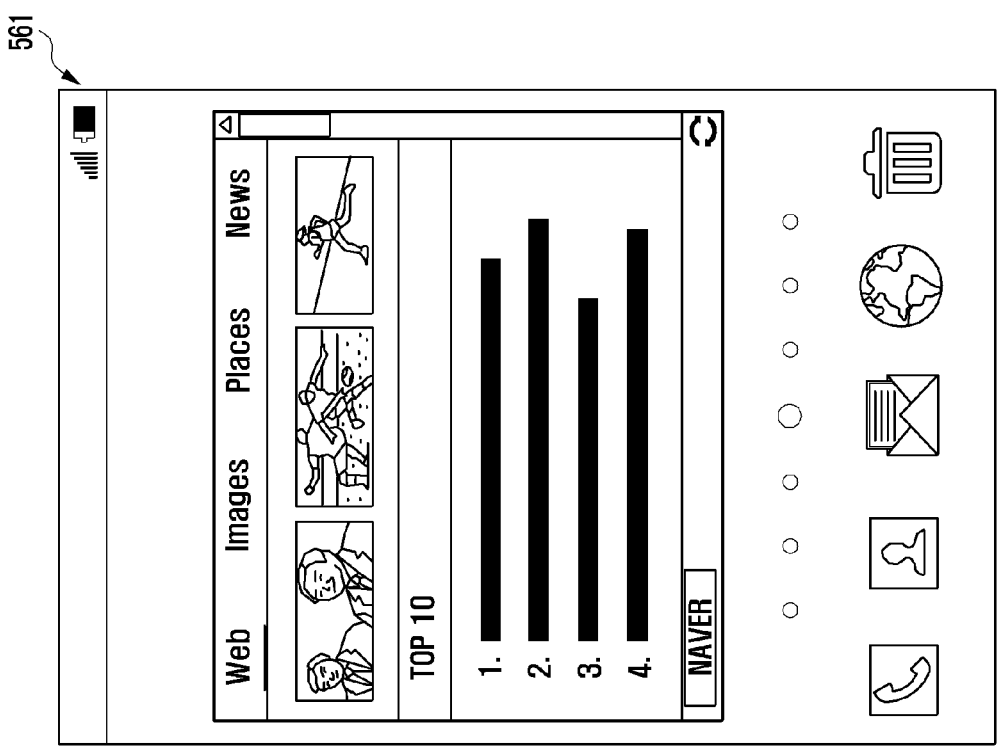

FIG. 5D illustrates the procedure of selecting an area to execute from the exemplary screen display 557 of FIG. 5C. That is, the user selects the entire webpage of the configurable portable site (e.g. Naver, Yahoo, and Google) or preview screen of the selected object as shown in the screen display 561 of FIG. 5D. In this state, if the user selects the content area 565 to be output as the briefing information as shown in the screen display 563 of FIG. 5D, the portable terminal configures the information in the area 565 (e.g. page information of the corresponding screen (URL information, etc.)) as the interested search information. That is, the content area selected on the webpage screen can be configured as search information. The selected content area information is provided to the dedicated server 260 such that the portable terminal 230 receives only the information included in the selected content area or stores the selected content area information to receive the entire webpage of the preconfigured portal site from the dedicated server 260, checks the selected content area information, and collects the contents corresponding to the selected contents area from the entire webpage as the briefing information.

In the case of the universal server 270, the method described with reference to FIGS. 5A and 5B can be used. That is, the portable terminal 230 can configure the interested categories or keywords and extracts the information concerning the news category from the downloaded information to generate the briefing information.

Figure 5E:
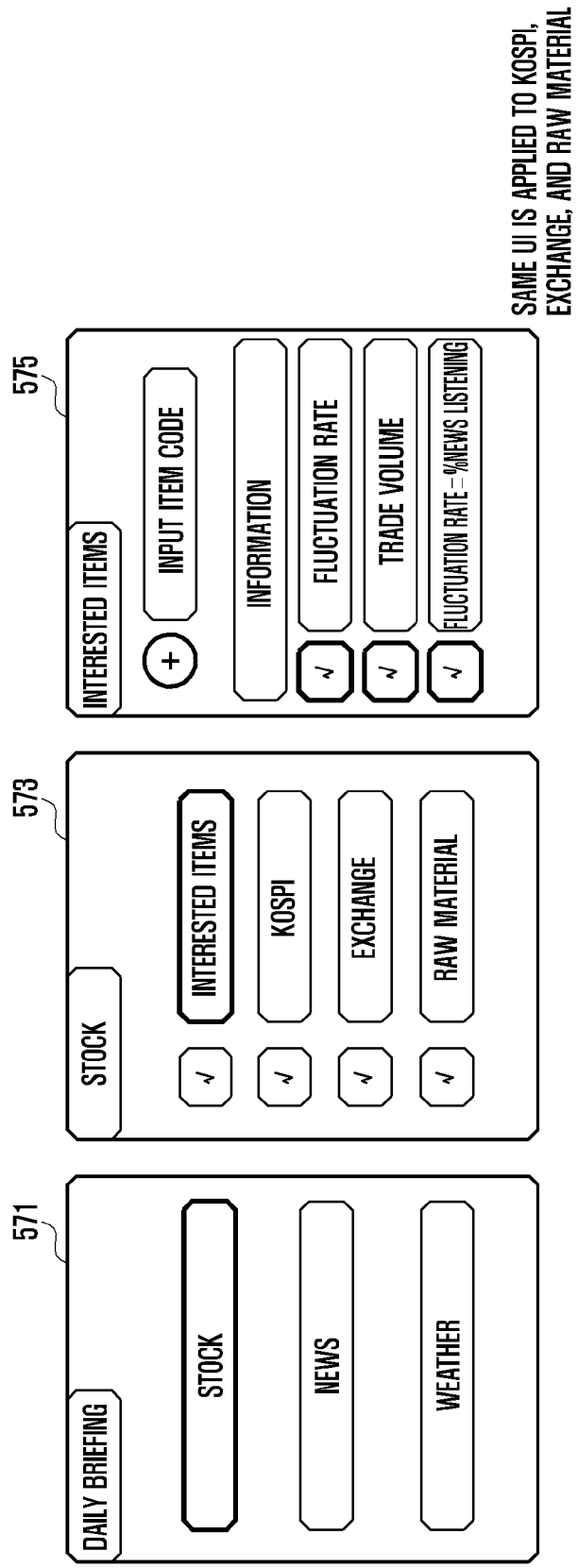

FIG. 5E illustrates the procedure of generating the interested search information when the interested subject is stock. If "stock price" is selected on the screen displaying the interested subject items as shown in the y screen display 571 of FIG. 5E, the control unit 100 displays the search items concerning the stock price as shown in the screen display 573 of FIG. 5E. If the "interested item" is selected, the control unit 100 displays the items capable of configuring the briefing information in association with the corresponding interested item. As shown in FIG. 5E, the user is capable of configuring the interested search information related to the stock price and generating the search information on interested items selected by the user.

Figure 5F:
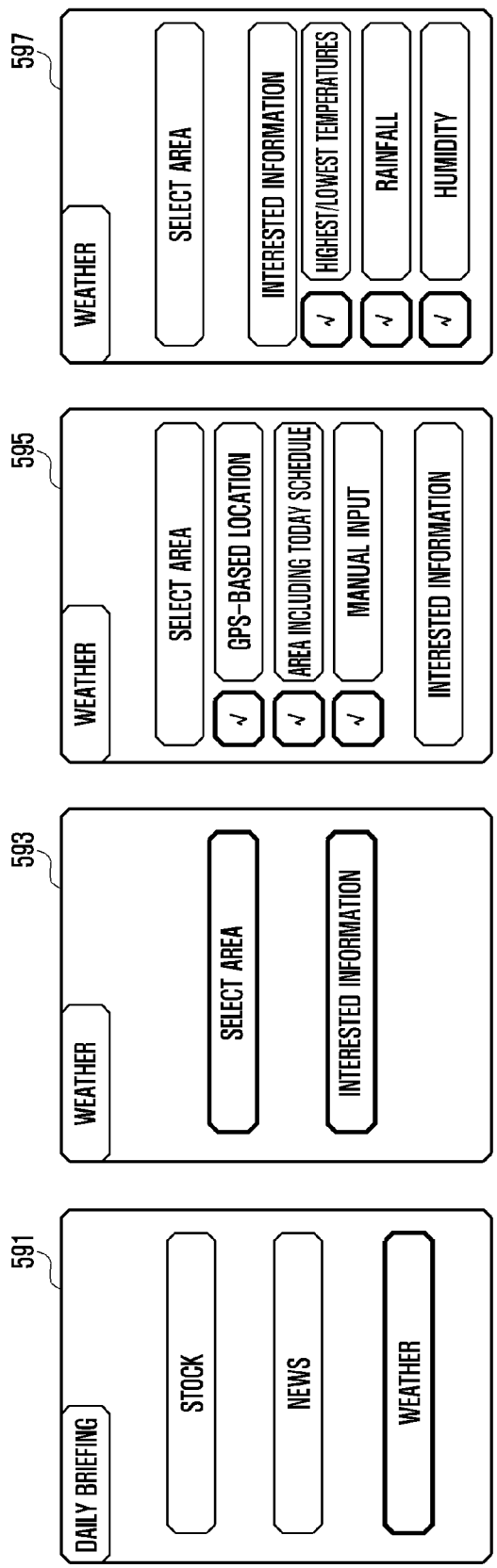

FIG. 5F illustrates the procedure of generating the interested search information when the interested subject is weather. If "weather" is selected on the screen displaying the interested subject items as shown in the screen display 591 of FIG. 5F, the control unit 100 displays the items capable of selecting an area and provision information as shown in the screen display 593 of FIG. 5F.

If "select area" item is selected, the control unit 100 displays the input boxes as shown in the screen display 595 and, if "interested information" item is selected, displays the input boxes capable of selecting the weather information items to be provided as shown in the screen display 597.

As described above, the control unit 100 configures the briefing information to be provided with the briefing alarm service through steps 417 to 431 of FIG. 4A. The control unit 100 repeats steps 419 to 427 to configure the interested search information of the selected interested subject. If the interested search information configuration is completed for all the interested subjects (stock, weather, news, etc.), the control unit 100 detects this at step 431 and displays the briefing alarm menu at step 415. Here, the briefing alarm menu may include alarm time setting, briefing information output device setting, alarm type setting, and alarm turn-off setting items.

If the alarm time setting item is selected, the control unit 100 detects this at step 451 and displays the menu items for configuring the download time and alarm time of the briefing information. If the user inputs the download time and alarm time using the input unit 140, the control unit 100 registers the input download time and alarm time at steps 455 to 459. At this time, if the download time is set to 30 minutes and the alarm time is set to 06:00, 05:30 is registered as the download start time along with the alarm start time of 06:00.

If the portable terminal 230 is in the briefing information output configuration mode, the control unit 100 detects this at step 461 and determines whether the peripheral device setting is configured at step 463. If the peripheral device setting is configured, the control unit 100 searches for the connectable peripheral devices and displays the found peripheral devices and registers the selected peripheral devices in the form of communication link information at step 465. If the portable terminal 230 is operating in the peripheral device configuration mode and outputting the briefing information, the control unit 100 performs a pairing process with the peripheral device 210, displays a list of the connectable peripheral devices, and registers the communication modes and identifiers of the peripheral devices selected by the user as the briefing alarm devices. At this time, the peripheral devices may be able to establish one of the aforementioned wireless communication links.

If the portable terminal 230 is in the alarm type configuration mode, the control unit 100 detects this at step 471 and, if an alarm type is selected, registers the alarm type selected by the user at step 473.

If the alarm turn-off setting item is selected, the control unit 100 detects this at step 481 and, if an alarm turn-off method is selected by the user, registers the alarm turn-off method at step 483. Here, the alarm turn-off method may be touch-based turn-off using the input unit 140, action-based turn-off using the sensor unit 160, and the gesture-based turn-off using the camera unit 120.

If the "end" item is selected on the briefing alarm menu screen, the control unit 100 detects this at step 491 and ends the briefing alarm configuration procedure at step 491. If none of the briefing information setting, alarm time setting, briefing information output device setting, alarm type setting, and alarm turn-off setting is selected in the briefing alarm configuration mode, the control unit 100 maintains the function as configured previously.

By configuring the briefing alarm service in the above procedure and method, the portable terminal 230 downloads the briefing information at the configured download time and outputs the downloaded briefing information at the configured alarm time. In the case of using the dedicated server 260, the portable terminal 230 may use a method of sending the dedicated server 260 the interested search information and requesting the dedicated server 260 to transmit the retrieved information at the download time or a method of sending the interested search information at the download time to receive the briefing information.

In the method of transmitting the interested search information and downloading the briefing information at the download time (former method), the control unit 100 of the portable terminal 230 sends the dedicated server 260 the interested search information. The interested search information may include user-configured alarm time, interested categories values, user-designated interested keyword values, filter values ("most viewed," "most replied," and "most recently posted"), arrangement scheme, user terminal location value (e.g. GPS value), and appointment values. The method of updating the interested search information may be performed such that retransmitting the update data from portable terminal 230 to the dedicated server 260 occurs periodically (e.g. 1 time a day/a few times a week) or when the initial configuration values change.

Then, the dedicated server 260 maps the configuration information values received from the portable terminal 230 to the corresponding terminal and stores the mapping information. The dedicated server 260 collects the data corresponding to the "interested categories values" and "user-designated interested keyword values" using the interested search information of the terminal. The collected data is filtered with the filter value and then reordered/rearranged. In the case of collecting and using the data, the location of the terminal and the schedule of the user can be considered. If it is determined that the user is located in New York, the information related to the New York can be provided based on the "interested category value" and the "user designated interest keyword value." The dedicated server 260 can send the portable terminal 230 the briefing information retrieved at the download request time, and the download time may be configured a few seconds or minutes before the alarm time. If the briefing information has been collected already based on the user-interested search information and if the alarm time of the terminal is known, the dedicated server 260 may determine the download time in consideration of the transmission time of the briefing information. In this case, the briefing information transmitted to the portable terminal 230 may be the most recently updated information. The control unit 100 searches for the configured schedule information and/or private information and registers the found information with the storage unit 110 as the briefing information.

The portable terminal 230 downloads the briefing information transmitted from the dedicated server 260 and outputs the alarm at the alarm time. If an alarm turn-off command is input by the user of a predetermined action is detected by the sensor unit 160, the control unit 100 controls to display the downloaded briefing information. At this time, the user may not pay visual attention to the briefing information (for preparing to go to work in the case of morning call alarm). For this reason, the briefing information may be output in the form of a voice message and/or a text message. Accordingly, if it is detected that the user is aware of the alarm state, the portable terminal 230 sends the briefing information in the format voice message and/or data to the audio processing unit 150 and the display unit 130. If a peripheral device 210 is configured for output of the briefing information, the control unit 100 outputs the briefing information to the configured peripheral device 210. In the case of outputting the briefing information to the peripheral device 210, the briefing information displayed on the portable terminal may be omitted. At this time, the portable terminal 230 communicates the peripheral device through one of the aforementioned short range wireless communication links established by the communication unit 170, and the peripheral device 210 may be any of an indoor Home Automation (HA) system speaker, TV, audio device, computer, and car speaker.

The portable terminal 230 sends the dedicated server 260 the interested search information, and the dedicated server 260 collects the information corresponding to the interested search information at a predetermined interval and transmits the collected information to the portable terminal 230 at the downlink time. The portable terminal 230 sends the server the interested search information at the preset download time, and the server searches for the information corresponding to the interested search information and transmits the found information to the portable terminal 230. It is noted that this method can be used by both the dedicated server and universal server.

Figure 6:
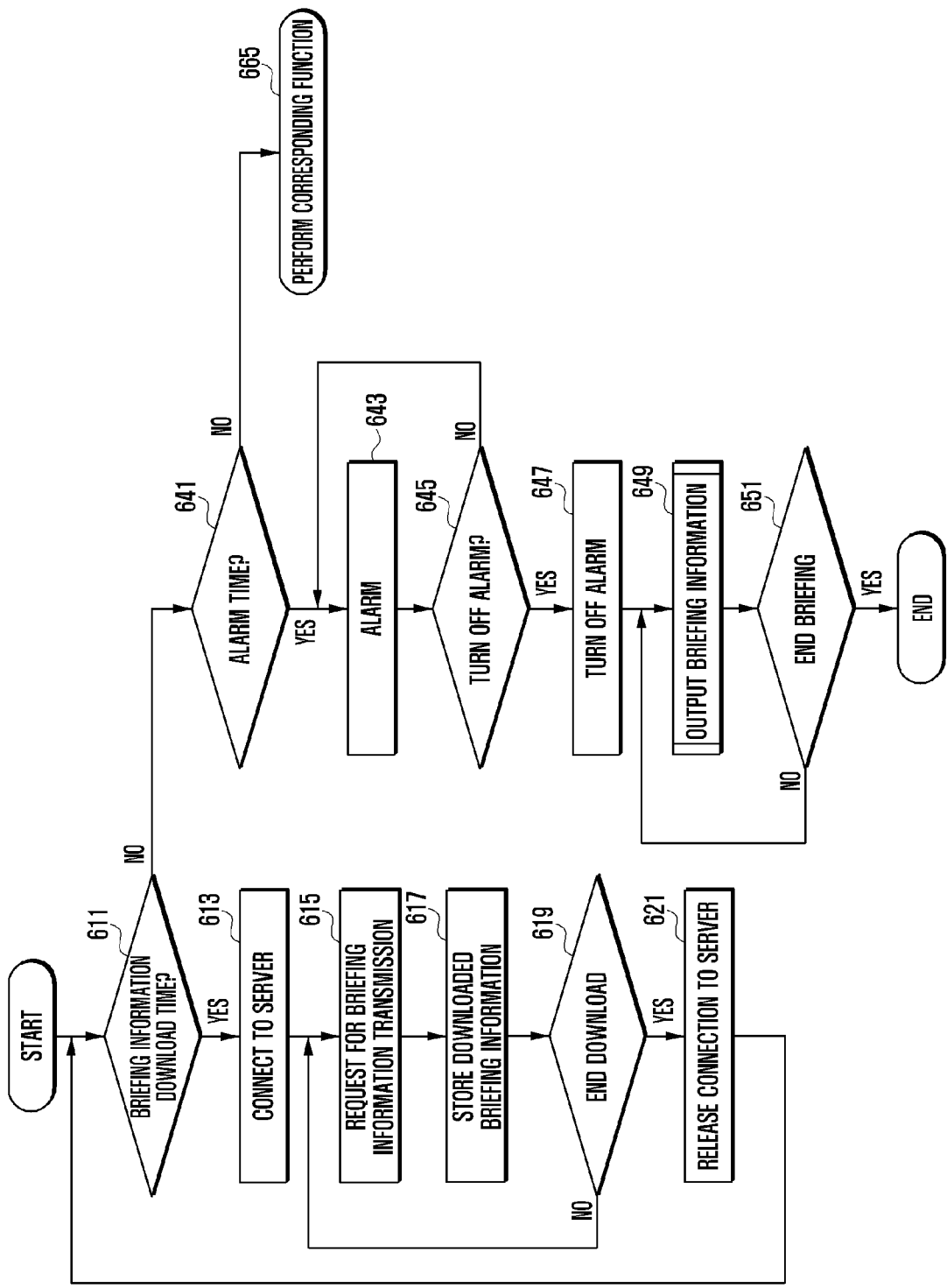
FIG. 6 is a flowchart illustrating the briefing alarm serving provision method according to an embodiment of the present invention.

FIG. 6 is a flowchart illustrating the briefing alarm serving provision method according to an embodiment of the present invention.

Referring to FIG. 6, the control unit 100 checks the download time configured for downloading the briefing information in step 611. The download time is set to the time before the alarm time and earlier enough to complete download of the information corresponding to the interested search information. At this time, the download time of the briefing information arrives, and the control unit 100 detects this and connects the communication unit 170 to a predetermined server at step 613 and requests the server to transmit the briefing information at step 615.

The briefing information can be transmitted in two ways as described above. In the embodiment, where the server is the dedicated server 260 and the interested search information has been transmitted already, the server is in the state that the interested information of the corresponding terminal has been collected. In this case, the control unit 100 of the portable terminal 230 requests for transmission of the briefing information, and the server transmits the collected briefing information to the portable terminal 230. In this case, since the interval between the download time and the alarm time is determined in consideration of the communication time, it is possible to set the interval to a small time value. However, if the server is not the dedicated server or if it is necessary to receive the interested search information, the server has to perform the search based on the interested search information. In this case, the control unit 100 transmits the interested search information along with the briefing information request. Accordingly, in the latter case, since the search time has to be considered to determine the interval between the download time and the alarm time, the interval becomes longer than that of the former case. After transmitting the briefing information request to the server, if the briefing information is downloaded, the control unit 100 stores the downloaded information in step 617, and the above steps are repeated until the server completes the transmission of the briefing information. If the server completes the transmission of the briefing information, the control unit 100 detects this at step 619 and releases the connection to the server at step 621. The control unit 100 confirms that the information processed by the portable terminal 230 is the briefing information and, if so, stores the corresponding information items as the briefing information.

Here, the configuration information of the portable terminal 230 may include the schedule information and communication-related personal information. As described above, the control unit 100 completes the download and search for the briefing information, stores the briefing information in the storage unit 110, and waits for the alarm time.

If the alarm time arrives, the control unit 100 detects this at step 641 and outputs the alarm in a predetermined manner at step 643. The alarm may be turned off in a predetermined turn-off method. If a turn-off command is input through the input unit 140, a predetermined turn-off action is detected by the sensor unit 160, or the user (e.g. eye) is detected by the camera unit 120 in a predetermined time, the control unit 100 detects this at step 645, and turns off the alarm at step 647. If the alarm time does not arrive at step 641, a corresponding function is performed at step 665.

After the alarm is turned off, the control unit 100 outputs the briefing information stored in the storage unit 110 at step 649 and determines if the briefing ends at step 651.

Figure 7:
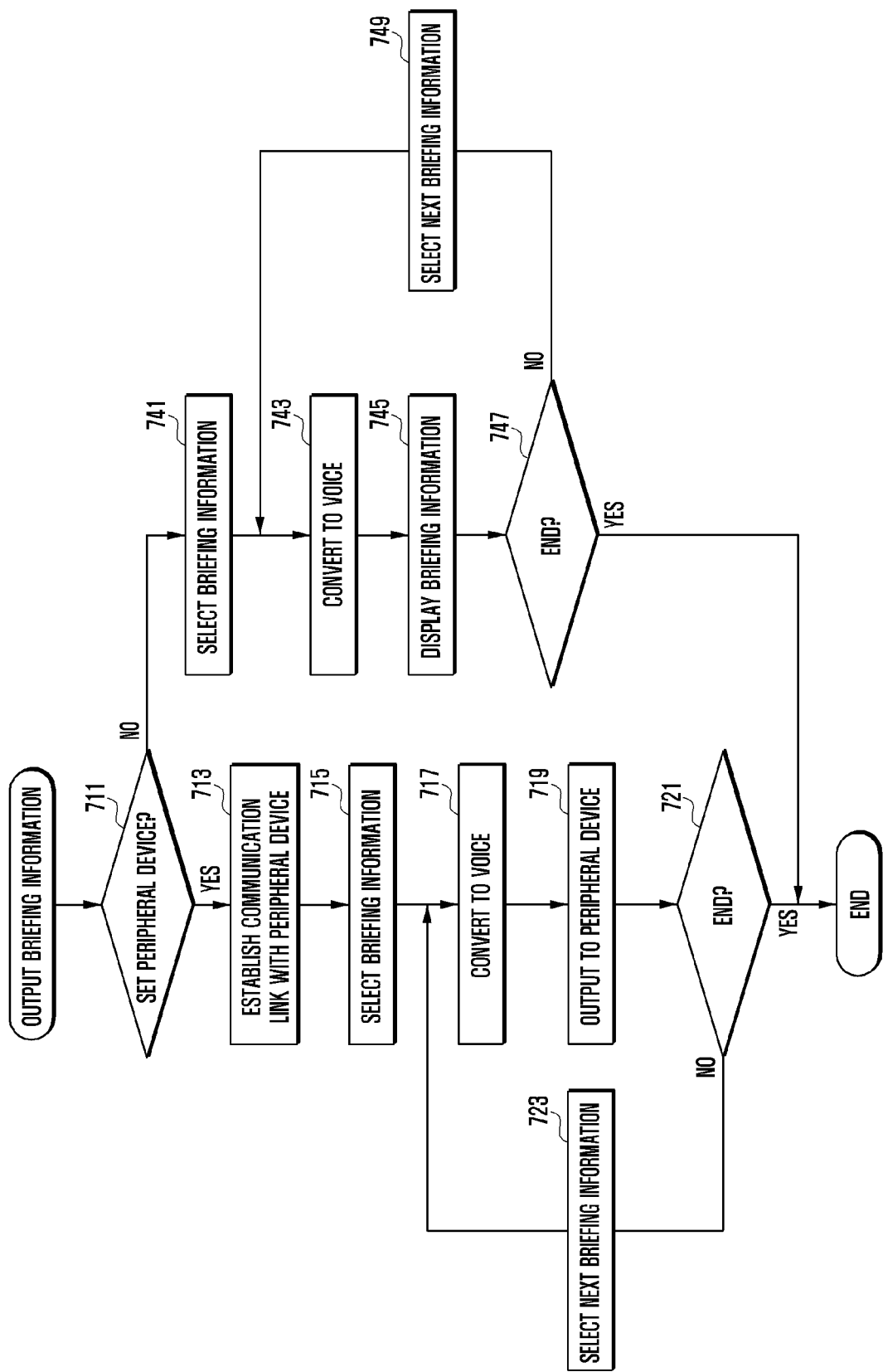
FIG. 7 is a flowchart illustrating the briefing information output procedure of the briefing alarm provision according to the method shown in FIG. 6.

FIG. 7 is a flowchart illustrating the briefing information output procedure of the briefing alarm provision method shown in FIG. 6.

Referring to FIG. 7, if a peripheral device setting has been configured, the control unit 100 detects this in outputting the briefing alarm information at step 711 and checks the communication information of the peripheral device 210 (communication mode and link information) to establish a communication link with the peripheral device 210 by means of the communication unit 170 at step 713. Afterward, the control unit 100 displays the briefing information stored in the storage unit 110. At this time, the control unit 100 selects the briefing information according to the output priority of the briefing information at step 715, converts the briefing information to a voice message (text-to-speech) at step 717, and outputs the voice message to the peripheral device in step 719. At this time, briefing information may not be output to the display unit 130 and the audio processing unit 150 of the portable terminal 230. If the briefing information output ends, the control unit 100 detects this at step 721 and ends the briefing alarm service, if not the control unit 100 selects the next briefing information at step 723 and repeats the voice briefing steps in the same manner as described above. If the briefing alarm service ends, the control unit 100 may delete the briefing information stored in the storage unit 110.

If a peripheral device is not configured, the control unit 100 detects this at step 711, performs steps 741 to 749 to convert the briefing information to voice message, and plays the briefing information through the display unit 130 and the audio processing unit 150.

As described above, the briefing information may include news, stock, weather, appointments, and user's assignments (student's study assignments). The portable terminal 230 performs the briefing alarm service by outputting the registered interested information (news, stock, weather, appointments, assignments, etc.) in an order of priority. In the case that the GPS-based location information provision function is configured, the portable terminal 230 may check its location in providing the briefing alarm service and download the country information (i.e. main news and weather of the corresponding country) from the server (international category or keyword of the new may be transmitted for retrieving the country news). In the case that the time zone changes during a trip abroad (i.e. if the time zone of the country where the briefing alarm is registered differs from the time zone of the current country), the control unit 100 may change the download time and alarm time automatically in consideration of the time difference.

If the portable terminal 230 moves during use (e.g., while providing the briefing alarm service), the portable terminal detects the distances between the portable terminal 230 and the peripheral devices 210 and outputs the briefing information to the closest peripheral device. In the case that the peripheral device 210 is configured to provide the briefing alarm service, the control unit 100 may be configured such that the briefing information is not transferred to the display unit 130 and the audio processing unit 150.

According to an embodiment of the present invention, the briefing alarm service can be provided in the form of speech. This is advantageous in the situation where the user may not pay visual attention to the briefing information. In this embodiment, the briefing alarm service may be configured so that a user can stop or skip playing the briefing information and/or jump to the next information.

In an embodiment of the present invention, the briefing information playback may be controlled with voice commands, and the control unit 100 may execute the voice recognition function on the background so as to detect the voice command (next, stock, new, stop, etc.) input by the user and execute the corresponding command. At this time, if the category changes before the current category (e.g. news, stock, and weather) briefing completes, the incomplete category briefing may be marked. After other categories briefings have completed, the portable terminal may prompt the user to determine whether to complete the incomplete category briefing.

As described above, the briefing alarm service apparatus and method is capable of collecting the user's interest information occurred before the alarm time and briefing the collected information to the user. That is, the user's interest information set by the user is automatically briefed to the user right after the alarm. The information briefing may be provided through other peripheral devices 210 communicating with the portable terminal as well as the portable terminal.

While the present invention has been particularly shown and described with reference to certain embodiments thereof, it will be understood by those of ordinary skill in the art that various changes in form and details may be made therein without departing from the spirit and scope of the present invention as defined by the following claims and their equivalents.

What is claimed is:

1. A method for providing briefing information from a portable terminal to a user, the method comprising:
setting an alarm time for outputting a preset alarm;
receiving the briefing information before arrival of the alarm time set according to a briefing alarm configuration;
outputting an alarm at the alarm time; and
displaying the briefing information when the alarm turns off,
wherein the briefing alarm configuration is turned off when the user's eye is detected by a camera unit during a predetermined time.

2. The method of claim 1, wherein displaying the briefing information comprises converting the briefing information to a voice message.

3. The method of claim 2, wherein the briefing information is user-interested information including news, stock price, weather, appointments, and private information.

4. The method of claim 2 further comprising;
configuring a briefing alarm, wherein configuring the briefing alarm comprises:
displaying briefing subject items;
displaying an interested search word menu of the briefing subject items; and
storing user-interested search information selected by the user.

5. The method of claim 4, wherein configuring the briefing alarm further comprises displaying a search server which searches for the briefing subject items.

6. The method of claim 5, wherein the search server is a dedicated server, and the method further comprises:
transmitting a briefing information request message including at least one of the interested search information or download time to the dedicated server; and
downloading the briefing information corresponding to the interested search information from the dedicated server at the download time earlier than a briefing alarm time.

7. The method of claim 5, wherein the search server is a dedicated server, and the method further comprises:
transmitting to the dedicated server a briefing information request message including at least one of interested search information at a download time earlier than a briefing alarm time; and
downloading the briefing information corresponding to the interested search information from the dedicated server.

8. The method of claim 5, wherein the search server is a universal server, and the method further comprises:
transmitting a briefing information request message including at least one of interested search information at a download time earlier than a briefing alarm time; and
downloading the briefing information corresponding to the interested search information, the interested search information including Uniform Resource Locator (URL) of the universal server and a user configured region value.

9. The method of claim 2, comprising configuring a briefing alarm comprising:
displaying a download time and an alarm time menu; and
registering the download time earlier than the download time configured based on the alarm time.

10. The method of claim 9, wherein configuring the briefing alarm further comprises configuring a peripheral device for displaying the briefing information.

11. The method of claim 10, wherein configuring the briefing alarm further comprises configuring an alarm turn-off for configuring the briefing alarm in a voice and/or action type.

12. The method of claim 2, wherein a briefing information request is performed at a download time configured earlier than the alarm time.

13. The method of claim 12, wherein displaying the briefing information further comprises:
turning off the alarm when an alarm turn-off signal configured by a response of the user is initiated; and
displaying stored briefing information.

14. The method of claim 10, wherein displaying the briefing information further comprises establishing a communication link with a peripheral device to output the briefing information.

15. The method of claim 14, wherein the peripheral device is a television and displaying the briefing information further comprises transmitting the briefing information and corresponding voice briefing information to the television.

16. A briefing alarm service apparatus configured for use with a portable terminal, the apparatus comprising:
a communication unit configured to download interested briefing information;
a storage unit configured to store the downloaded briefing information;
an output unit which outputs the briefing information; and
a control unit configured to control the communication unit to download the interested briefing information at a preset download time and play the downloaded briefing information at an alarm time,
wherein the control unit is further configured to set the alarm time for outputting a preset alarm, to receive the downloaded briefing information before arrival of the alarm time set, to display the downloaded briefing information when an alarm turns off, and to turn off the briefing alarm, when a user's eye is detected by a camera unit during a predetermined time.

17. The briefing alarm service apparatus of claim 16, wherein the control unit is configured to convert the briefing information to a voice message and outputs the voice message to the output unit, wherein the output unit is an audio processing unit.

18. The briefing alarm service apparatus of claim 16, wherein the control unit is configured to generate and register interested-search information of the briefing information, and the briefing information comprises at least one of news, stock information, weather information, or appointments.

19. The briefing alarm service apparatus of claim 16, wherein the control unit is configured to configure the alarm time and the download time in a briefing alarm configuration mode, and the download time is set to a time earlier than the alarm time to allow the briefing information to be downloaded prior to the alarm time.

20. The briefing alarm service apparatus of claim 16, wherein the control unit is configured to turn off the alarm when a predetermined alarm turn-off signal is input by a user and outputs the briefing information.

21. The briefing alarm service apparatus of claim 17, wherein the control unit is configured to establish a communication link with a peripheral device configured to playback the briefing information.

22. The method of claim 1, wherein receiving the briefing information comprises configuring a download time for downloading the briefing information along with the alarm time so as to download all of the briefing information before the arrival of the alarm time.

* * * * *